C. W. HODGES.
TIRE CHAIN.
APPLICATION FILED FEB. 5, 1917.
1,293,436.
Patented Feb. 4, 1919.
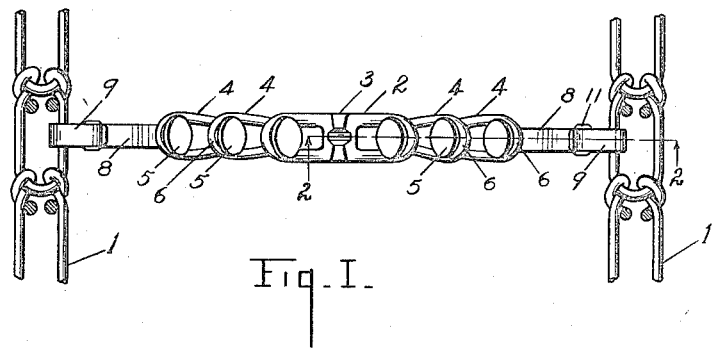
Fig. I.
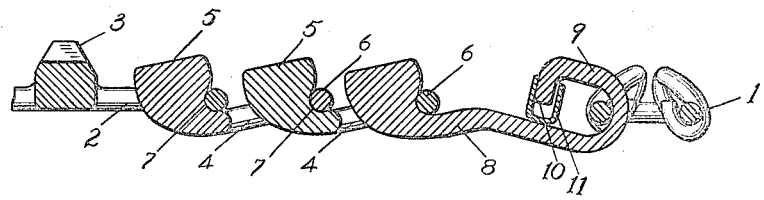
Fig. II.
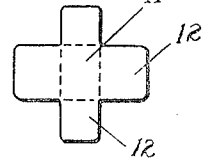
Fig. IV.
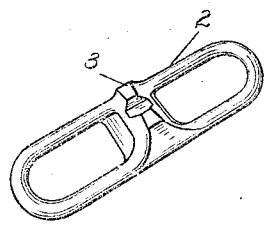
Fig. III.
WITNESSES:
Lenn Gilman
Luther Blake
INVENTOR.
CHAUNCEY W. HODGES.
BY Chappell Earl
ATTORNEYS.

UNITED STATES PATENT OFFICE.

CHAUNCEY W. HODGES, OF GRAND RAPIDS, MICHIGAN.

TIRE-CHAIN.

1,293,436.  Specification of Letters Patent.  Patented Feb. 4, 1919.

Application filed February 5, 1917. Serial No. 146,709.

*To all whom it may concern:*

Be it known that I, CHAUNCEY W. HODGES, a citizen of the United States, residing at Grand Rapids, in the county of Kent and State of Michigan, have invented certain new and useful Improvements in Tire-Chains, of which the following is a specification.

This invention relates to improvements in tire chains.

The main objects of this invention are:

First, to provide an improved tire chain which is very effective as an anti-slip device, and at the same time one which is very durable.

Second, to provide in a tire chain an improved cross member which may be readily renewed as a whole or in part as desired.

Further objects and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention, one of the cross members and only sections of the side members being shown.

Fig. II is an enlarged longitudinal section through the cross member, on a line corresponding to line 2—2 of Fig. I.

Fig. III is a perspective view of the central link of the cross member.

Fig. IV is a blank of the hook lock.

In the drawing, similar reference characters refer to similar parts throughout the several views.

Referring to the drawing, 1, 1, represent the side members of an anti-skid chain for vehicle wheels, the cross chains, only one of which is illustrated, comprising a link 2 having a central tread member 3 constituting a cross-bar for the link. Intermediate links 4 having laterally projecting heads 5 at one end and loops 6 at the other are provided. The loops 6 are of such size that the links may be joined by inserting the loop of one link through the adjacent coacting link as shown in Fig. II, the heads being of such size as to prevent their passing through the links when the neck portions 7 are engaged therewith as shown.

These heads constitute tread members and may be case hardened to increase their wearing capacity.

The outer links 8 are provided with hooks 9 instead of loops, the hooks being engaged with links of the side chains 1. These hooks preferably terminate in inwardly projecting bills 10 and I preferably provide in this connection locks 11 formed of cross-shaped pieces of sheet metal, the arms of which are bent up in a cup-like form to engage over the end of the hook, see Fig. II. The hooks 9 of the links 8 may be inserted through the loops of the links 4, the loop being slipped over the bill of the hook and then around its shank to engage the head. This is done before the locks are applied.

One of the arms 12 of the lock may be folded down to permit the removal of the lock and the disengagement of the hook 9 should occasion require. By this arrangement I provide a tire chain having a series of knobs constituting tread and traction members and also wear members.

The links 4 are substantially as shown in my application for Letters Patent filed June 26, 1916, Serial No. 105,909, for tire chains, allowed September 14, 1916, my present invention being an adaptation of such links. My present structure has certain advantages over the structure there illustrated.

Having thus described my invention, what I claim as new and desire to secure by Letters Patent is:

1. In a tire chain, a cross member comprising a central link, and links at each side thereof having loops at their outer ends, and laterally projecting heads at their inner ends engaging said central link and the loops of adjacent coacting links and constituting tread members, the links being engaged and disengaged by passing their loop ends through the coacting links.

2. In a tire chain, a cross member comprising a central link and links at each side thereof having loops at their outer ends and laterally projecting heads at their inner ends engaging said central link and the loops of adjacent coacting links, the links being engaged and disengaged by passing their loop ends through the coacting links.

In witness whereof, I have hereunto set my hand and seal in the presence of two witnesses.

CHAUNCEY W. HODGES. [L. S.]

Witnesses:
 LUELLA G. GREENFIELD,
 GRACE B. THOMPSON.